United States Patent [19]
Priestly et al.

[11] 3,829,801
[45] Aug. 13, 1974

[54] SIGNAL SWITCHING AND DISTRIBUTING SYSTEMS

[75] Inventors: Michael John Priestly, Stockport; Eric Cornthwaite, Denton, both of England

[73] Assignee: International Computers Limited, London, England

[22] Filed: Nov. 1, 1972

[21] Appl. No.: 302,706

[30] Foreign Application Priority Data
Nov. 2, 1971 Great Britain.................. 50,787/71

[52] U.S. Cl.................. 333/7, 333/84 M, 333/97 S
[51] Int. Cl.......................... H01p 5/02, H01p 1/10
[58] Field of Search.................... 333/7, 97 S, 84 M; 340/147 T; 307/38

[56] References Cited
OTHER PUBLICATIONS
Purvis et al., "Reed–Contact Switch Series for the I.F. Band," Bell System Tech. Jr., 2-1970, pp. 229-245

*Primary Examiner*—Eli Lieberman
*Assistant Examiner*—Wm. H. Punter
*Attorney, Agent, or Firm*—Misegades, Douglas & Levy

[57] ABSTRACT

A signal distribution system for applying signals to a device under test is described. An input signal is applied to a centre point of a first group of four relays on a substrate. The group of relays are arranged so that the input signal may be switched to one of four similar groups of relays so that the input signal may therefore be switched by operation of the appropriate relays to one of sixteen outputs. The overall transmission path lengths from the input point to each output are equal to thus provide all the paths with the same electrical characteristics. Further similar substrates may be spaced from the first substrate and in this case a common output channel for all substrates may be provided on a connecting plane.

2 Claims, 3 Drawing Figures

PATENTED AUG 13 1974  3,829,801

SIGNAL SWITCHING AND DISTRIBUTING SYSTEMS

BACKGROUND OF THE INVENTION

The present invention relates to signal distributing systems.

Various types of systems for testing electrical or electronic devices such as, for example, integrated circuits have been developed. With such systems, signals or pulses are generated and are applied to contacts or pins of a device under test and output signals from the device are monitored. While there are few problems in applying steady d.c. voltages to a particular device, it has been found difficult to apply pulses of extremely fast rise times, say 1 – 2 n.s. to the pins of a device under test without significant signal degradation.

As testing signals are frequently generated by a central processing unit of a computer and as signals must be applied over channels to the pins of a device under test, some means for distributing the signals is necessary. A switch matrix is commonly employed as such a signal distribution device, although problems of signal degradation will still exist for signals having extremely fast rise times.

Also, unless the insertion loss, and bandwidth of each path of such a matrix is constant, with as high a bandwidth and as low an insertion loss as possible, the signal transmission characteristics will vary and thus the output pulses will vary in amplitude and risetime resulting in non-uniform pulses appearing at the output ports of the matrix and poor fidelity in exactly reproducing at the output, the shape of the input signal.

Another problem with previous switch matrices is that such devices are constructed in a complex manner and in these cases replacement of parts is both difficult and expensive in conventional matrices. Thus, it is desirable to have a switch matrix of similar physical construction such that it may easily be dismantled for servicing.

SUMMARY OF THE INVENTION

According to one aspect of the present invention, a system for distributing signals includes a substrate, the substrate carrying an input terminal, first switching means arranged to switch a signal applied to said input terminal to one of a plurality of first low loss transmission lines, second switching means arranged to switch a signal respectively from a first low loss transmission line to one of a group of second low loss transmission lines, and a plurality of output terminals respectively connected one to each of said second low loss transmission lines, the configuration of the first and second low loss transmission lines being such that signal paths from the input terminal to each of the output terminals respectively all have substantially the same electrical characteristics.

According to another aspect of the present invention a system for distributing signals includes at least two spaced apart substrates, each substrate carrying an input terminal, first switching means arranged to switch a signal applied to said input terminal to one of a plurality of first low loss transmission lines, second switching means arranged to switch a signal respectively from a first low loss transmission line to one of a group of second low loss transmission lines, and a plurality of output terminals respectively connected one to each of said second low loss transmission lines, the configuration of the first and second low loss transmission lines being such that signal paths from the input terminal to each of the output terminals respectively all have substantially the same electrical characteristics; and connecting means for selectively connecting a pair of output terminations, one from each substrate, to an output channel.

BRIEF DESCRIPTION OF THE DRAWING

Signal distributing apparatus embodying the present invention will now be described, by way of example, with reference to the accompanying drawing, in which.

DESCRIPTION OF THE PREFERRED EMBODIMENT

Figure 1:
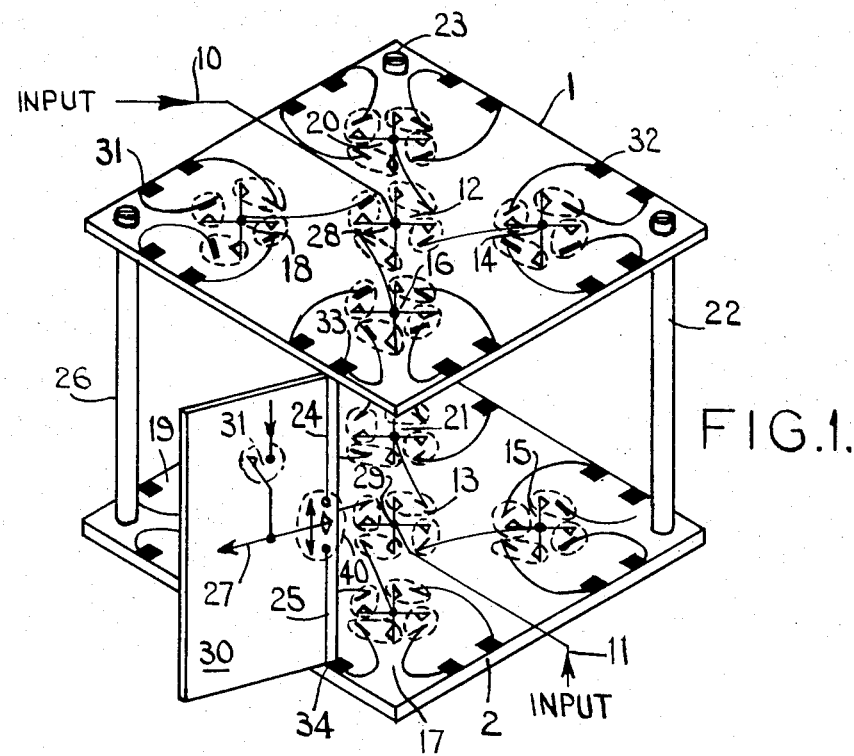
FIG. 1 shows a diagrammatic view of a switch matrix.

A preferred embodiment of the present invention is shown in FIG. 1.

A substrate 1, which may be a conventional printed circuit board, for example, has a centre point 28 to which an input signal is applied over line 10. A group of relays 12 is positioned about centre point 28. The group of relays consists of four individual relays arranged so that an input signal on line 10 may be switched upon energisation of the appropriate relay to any one of four outputs. Similar groups of relays 14, 16, 18 and 20 are positioned one in each corner of the substrate 1. These groups are connected one to each of the four outputs from group 12 to thus form a "tree" configuration and as each of these groups also consist of four relays, similarly arranged to those of group 12, an input signal may therefore be switched, by operation of the appropriate relays, to any one of 16 outputs. For example, upon energisation of the appropriate relays in groups 12 and 16, an input signal will be switched from point 28 to output terminal 33.

In order to reduce electrical losses as much as possible, low loss strip transmission lines of 50 ohms impedance are provided as electrical conductors between groups of relays and from relays of a group to output terminals (such as terminal 33) on the edge of substrate 1. In order to provide signal paths between centre point 28 and any of the 16 output terminals having a similar propagation delay, the physical length of any one signal path must be substantially the same as the physical length of any other signal path. For example, the physical length of the signal path from centre point 28 to output terminal 33 is substantially the same as the physical length of the signal path from centre point 28 to output terminal 31 or 32. Thus, the propagation delay between centre point 28 and any output terminal will be a set or a constant figure, say 2 manoseconds. Clearly the overall lengths of the paths can be regulated by the configuration of the individual path lengths. In addition, the connections between the four relays of each group must also be kept to a minimum size so that uniform pulses will appear at the output terminals.

In FIG. 1, a further substrate 2 is provided with a line 11 for applying input signals to centre point 29. An arrangement of relays 13, 15, 17, 19 and 21 is positioned on member 2 similar to the arrangement of relays on member 1. Support pillars 22, and 26 positioned at opposite corners of substrates 1 and 2 space the substrates away from one another at any convenient distance, the screws 23 being used to attach the substrates 1 and 2 to the pillars. Third and fourth support pillars (not shown) are positioned in the other two corners of substrates 1 and 2, respectively. As is the case with substrate 1, the length of any signal path from centre point 29 of member 2 to any output terminal on member 2 is a predetermined length equal to the length of any other signal path. It is noted, however, that provided output signals to be applied to a subsequent utilisation device are all derived from a single substrate, then while the signal path lengths within one substrate are required to have similar characteristics it is not necessary that the characteristics of the paths on all substrates should be the same. Thus, the signal path length on substrate 2 does not have to equal the signal path length of substrate 1.

A connecting plane 30 may be positioned between substrates 1 and 2 to allow output signals on terminals 33 or 34 to be connected to common channel 27. Connecting plane 30 may be a conventional printed circuit board of appropriate size with conductors 24 and 25 connected to respective output terminals 33 and 34. A relay 40 switches either of lines 24 and 25 to common channel 27 while relay 31 is provided to allow various d.c. voltages to be applied over common channel 27. Further output planes 30 (not shown) may be provided between corresponding output terminals on substrates 1 and 2 to allow other common output channels 27 to receive output signals from centre point 28 (substrate 1) or centre point 29 (substrate 2). In this case since outputs from more than one substrate are switchable to a single effective output it will be clear that the characteristics of the paths on all those substrates should be similar.

Figure 2:
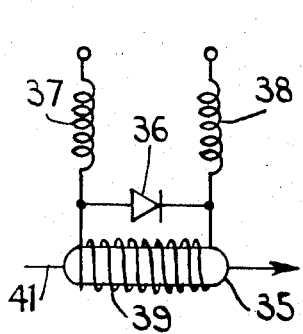
FIG. 2 shows in schematic form a particular component arrangement as employed in FIG. 1.

Referring to FIG. 2, there is shown a relay 35 which is substantially surrounded by a tightly wound energising coil 39. Choke coils 37 and 38 are connected in series with opposite ends of energising coil 39 while a diode 36 is connected across coil 39. Relays 35 are essentially film relays having mercury wetted contacts. These relays can be obtained commercially under the name "Logcell."

In some cases when relays are used in a multiple configuration, for passing pulses having very fast rise times, degradation of the pulse edge can occur due to the physical construction of the relay. In the present case, using film relays as described, the coil is electrically, tightly coupled to the switch element, thus by transformer action, some energy is extracted from the transient edge passing through the switch. If several energising coils are connected in parallel, this energy becomes sufficient to cause considerable degradation of a fast edge. This effect results in a slower rise time pulse at the output terminal and the likelihood of increased cross talk. Hence, choke coils 37 and 38 are provided in series with energising coil 39 together with the inclusion of diode 36 in parallel with energising coil 39. These coils 37 and 38 effectively decouple the relay 35 from any other part of the circuit, to provide a switch having an increased bandwidth.

Figure 3:
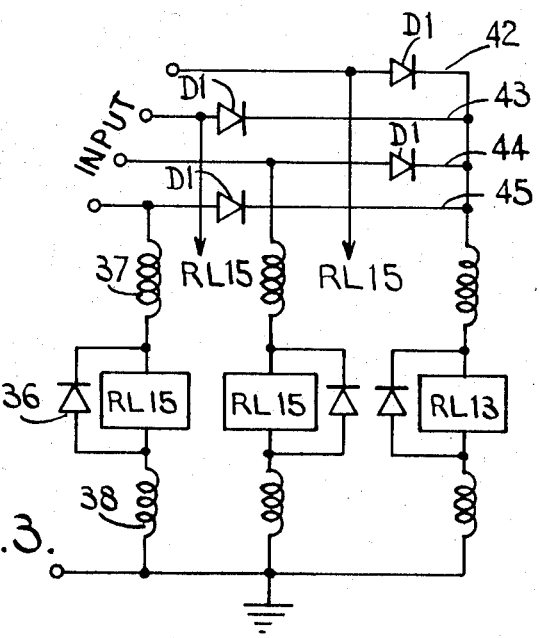
FIG. 3 shows in schematic form a portion of a circuit for driving relays of the switch matrix.

A circuit for energising relays of different groups to form an input — output signal path is shown in FIG. 3. A relay RL 13 is connected to receive an INPUT signal applied to any of lines 42 – 45. Relay RL 13 may be one relay in group 13 on member 2 and each INPUT will be applied to a separate relay RL 15 of relay groups 15, for example. In operation, an INPUT applied to line 42 will energise relay RL 13 of group 13 and one relay RL 15 of group 15 while an INPUT applied to line 45 will energise the same relay RL 13 and another relay RL 15 of group 15.

Although two substrates 1 and 2 have been shown in FIG. 1, it is clear that the present invention is not limited to a structure of two substrates. For example, a single substrate may be employed to distribute an input signal from a centre point 28 to any one of a plurality of output terminals on the same substrate. Similarly additional relays and input terminals can be added to board 30 in order to allow any number of substrates 1 to be added and thus increase the number of paths which may be connected to a common channel.

While each group of relays 14, 16, etc has four individual relays, any number of relays may be employed in a group subject to the permissable tolerance of signal degradation.

In FIG. 1, output terminals 33 and 34 are shown connected to lines 24 and 25, respectively, on connecting plane 30. A plug and socket arrangement (not shown) may be employed to make these necessary connections at the top and bottom of connecting plane 30. If the plugs and sockets are attached to the plane 30 and the substrates 1 and 2 respectively they will also rigidly support the connecting plane between substrates 1 and 2. However, any other convenient method for making these connections may be employed.

While substrates 1 and 2 have been described as planar, the present invention is not to be limited to planar substrates 1 and 2. Similarly, while inputs are applied to centre points 28 and 29 in FIG. 1, the point at which an input is applied to member 1 or 2 does not have to be in the centre although the centre point of substrates 1 or 2 may be most convenient. What is essential is that the overall length of one transmission path is equal to the overall length of any other transmission path on the same substrate. For example, the corners of substrates 1 or 2 may be rounded or the substrates may be circular with the centre point of each group of relays 12 and 13, being at the centre of the corresponding circle. In such a case the transmission paths would conveniently follow a radial path.

We claim:

1. A switching system for distributing signals including at least two spaced apart substrates arranged in substantially parallel planes, each substrate carrying a plurality of first low loss transmission lines, a signal input terminal, first switching means connected between said signal input terminal and said first low loss transmission lines, a plurality of output terminations, a plurality of second low loss transmission lines each connected respectively to a different one of the output terminations and second switching means having separate switches connected respectively each between a corresponding one of the first low loss transmission lines and a group of the second low loss transmission lines, the configuration of the first and second low loss transmission lines being such that signal paths from the input terminal to each of the output terminations respectively all have substantially the same signal transmission characteristics; and at least one further substrate abutting at least two of said spaced apart substrates, said further substrate carrying at least one output channel and connecting means for selectively connecting a pair of output terminations, one from each substrate to said output channel.

2. A system for distributing signals as claimed in claim 1 including a plug and socket arranged electrically to connect said further substrate to said spaced apart substrates and wherein said connecting means includes a relay.

* * * * *